United States Patent [19]

Keeney

[11] 3,920,913

[45] Nov. 18, 1975

[54] RINGBACK TONE APPARATUS AND TELEPHONE METERING SYSTEM

[75] Inventor: Clare G. Keeney, Campbell, Calif.

[73] Assignee: TRW Inc., Los Angeles, Calif.

[22] Filed: Jan. 31, 1974

[21] Appl. No.: 438,418

[52] U.S. Cl. .......... 179/8 A

[51] Int. Cl.$^2$ .......... H04M 15/38

[58] Field of Search .......... 179/8 A, 8 R, 7 R, 7.1 R, 179/7 MM

[56] References Cited

UNITED STATES PATENTS

| | | | |
|---|---|---|---|
| 3,335,231 | 8/1967 | Gray et al. | 179/8 A |
| 3,808,373 | 4/1974 | McLaughlin | 179/8 A |
| 3,829,618 | 8/1974 | Brandon | 179/8 A |

*Primary Examiner*—Kathleen H. Claffy
*Assistant Examiner*—Gerald L. Brigance
*Attorney, Agent, or Firm*—Flehr, Hohbach, Test, Albritton & Herbert

[57] ABSTRACT

Disclosed is a message metering apparatus having detectors for detecting trunk busy, line busy and ringback tones in a telephone system. A called-party answer is detected by determining when, after initiation, the ringback tone stops. The tone detectors include analog sections for forming digital representations of the trunk busy, line busy and ringback tones and include digital sections for measuring the digital representations. The digital sections discriminate against signals of undesired pulse width and frequency.

16 Claims, 8 Drawing Figures

RINGBACK TONE APPARATUS AND TELEPHONE METERING SYSTEM

CROSS REFERENCE TO RELATED APPLICATION

1. TELEPHONE EXCHANGE METERING SYSTEM, Ser. No. 404,873, filed Oct. 10, 1973, invented by Winston D. Gayler and James E. Ahern, and assigned to Vidar Corporation.

2. LINE INDENTIFICATION AND METERING SYSTEM, Ser. No. 449,384, filed Mar. 8, 1974, invented by Harold Tysseland, and assigned to Vidar Corporation.

BACKGROUND OF THE INVENTION

The present invention relates to message metering apparatus and to tone detectors for detecting the presence of tones found in telephone systems.

Message metering equipment is useful for recording information resulting from toll, long distance and other types of telephone service. Equipment to gather this information requires the ability to detect and store information for example at branch exchanges and at central offices. Existing private automatic branch exchange equipment does not generally provide the capability of identifying which line or which extension number on the line is the calling party. Such information is particularly desirable in telephone usage accounting and telephone usage engineering. Usage accounting is the function of identifying particular lines or extensions which place a call to allow a particular department or person to be responsible for the cost of the calls made. Usage engineering is the function of providing communications engineers with call usage levels, grading indications and possible maintenance trends as well as furnishing accurate loading figures to determine overall equipment requirements.

While many central offices provide an answer supervision signal for indicating when a called party has answered, many other central offices do not provide an answer supervision signal. Where an answer supervision signal is not available, it is desirable for metering purposes to provide some other means for indicating that a called party has answered. Also for metering and traffic study purposes, it is also desirable to observe line busy and trunk busy conditions.

The signals which are typically always present in a telephone system are the ringback tone, the trunk busy tone and the line busy tone. The ringback tone is heard in a telephone receiver after an available station has been dialed. The ringback tone continues until the called party answers or until the calling party hangs up. The ringback tone is not generally in phase with the sound of the called stations ringer but is usually produced by a different generator. A typical ringback tone includes the frequency 440Hz and 480Hz linearly mixed at −16dbm for each frequency. The ringback tone interruption rate typically includes two seconds on and four seconds off in modern equipment. In older equipment, the ringback tone frequently consisted of 42OHz modulated by 40Hz. Other combinations of tones, however, are frequently encountered in telephone systems.

The line busy tone is typically a low tone interrupted at 60 interruptions per minute. The low tone is frequently 480Hz and 620Hz linearly mixed −24dbm for each frequency. The line busy tone is typically interrupted 60 times per minute with 0.5 second on and 0.5 second off.

The trunk busy tone typically has an interruption rate of 120 interruptions per minute. A local trunk busy tone is typically defined as 0.3 second on and 0.2 second off and a toll trunk busy tone is typically defined as 0.2 second on and 0.3 second off. The basic trunk busy tone before interruption is typically the low tone of 480Hz and 620Hz linearly mixed at −24dbm for each frequency. While these are typical values, other combinations are frequently encountered. In actual use, a trunk busy tone of 0.25 second on and 0.25 second off is commonly found.

While many different tones are produced from the above signals, one common factor usually present is a signal having a frequency which falls within the band from 400Hz to 500Hz. Unfortunately, the voice frequency spectrum falls heavily within this band, and therefore, there is a high probability that the calling party will create signals which are within the frequency band of the ringback tone and busy signals.

Wile apparatus exists for monitoring a line or an extension usage on standard interfaces, improved systems are desirable which exhibit greater reliability and economy and which are able to detect tones in the enviroment of a telephone system.

SUMMARY OF THE INVENTION

The present invention is a telephone metering apparatus in which subscriber usage of outgoing telephone trunks is monitored. The trunks are connected through an exchange to the subscriber stations. In the metering apparatus, receivers are assigned to active trunk circuits to monitor the outgoing calls on the trunks. In one embodiment, the receivers discriminate among ringback tones, trunk busy tones and line busy tones and the termination of the ringback tone is employed to commence the timing of the call duration. The detection of a busy tone allows the receiver to be immediately reassigned to some other active trunks.

In one embodiment of the present invention, the tone detectors for discriminating between the trunk busy, line busy and ringback tones include analog-to-digital converter means for converting the analog tone signals to rectangular wave signals which represent the on and off durations of the tone signals. In detecting each tone signal, means are provided to sense whether the turn-off time of each rectangular wave signal is earlier than a short limit and longer than a long limit. In another embodiment, an output is provided only when the presence of the desired tone has been detected continuously for a specific predetermined number of cycles.

In accordance with the above summary, the present invention achieves the objective of providing an improved metering system and tone detector for metering and detecting usage of a telephone system.

Additional objects and features of the invention will appear from the following description in which the preferred embodiments of the invention have been set forth in detail in conjunction with the drawings.

DETAILED DESCRIPTION

Figure 1:
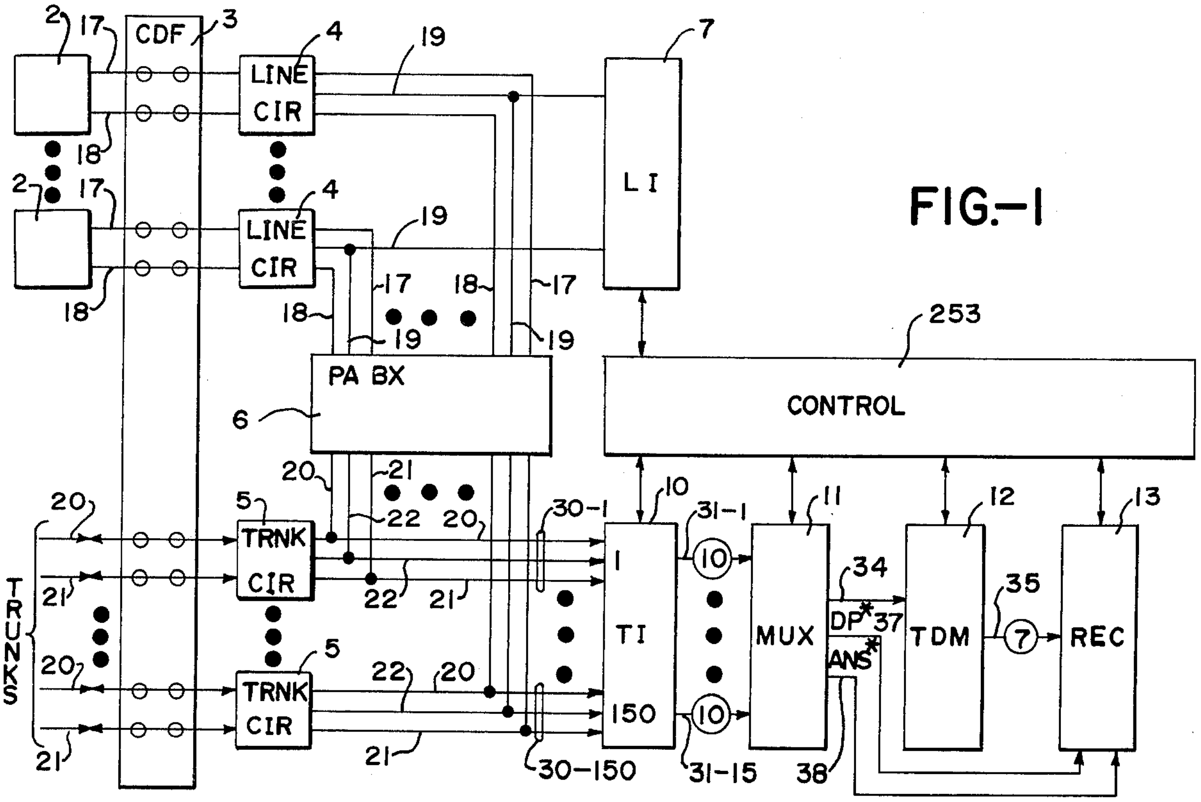
FIG. 1 depicts an overall block diagram of a metering system, including tone receivers, of the present invention connected to a telephone exchange.

Overall System — FIG. 1

Referring to FIG. 1, the telephone stations 2 are connected by tip and ring lines 17 and 18, respectively, over a central distribution frame 3 to respective line circuits 4. Within the line circuits 4, each tip and ring line is associated with a sleeve line 19. In a typical configuration, up to 1,800 stations and 1,800 associated line circuits are connected to an exchange 6. Each of the tip, ring and sleeve lines 17, 18 and 19, are available for connection by the exchange 6 to trunk tip, ring and sleeve lines 20, 21 and 22, respectively. The trunk tip, ring and sleeve lines from the exchange 6 are connected to trunk circuits 5 and to the trunk interface (TI) 10. Th trunk circuits 5 in turn have the trunk tip and ring lines 20 and 21 connected to the central distribution frame 3 where they are connected to the outgoing trunk lines.

The metering system is connected to the telephone system on both the station and trunk sides of the exchange 6. Each of the sleeve lines 19 from the line circuits 4 on the station side of the exchange 6 are connected as input to the line interface and encoder 7. In a typical configuration the exchange 6 is a private automatic branch exchange (PABX) of the 701B type which services up to 1,800 lines. Accordingly, the line interface and encoder 7 receives 1,800 input sleeve lines. The line interface and encoder 7 senses an ID signal on one of the sleeve lines 19 and identifies which one of the lines 19 has the ID signal and communicates that information to control 253.

The ID signal is initiated in control 253 and is connected through the trunk interface 10 to the appropriate busy trunk sleeve line 22. The ID signal is connected through the trunk interface and the exchange 6 to the associated sleeve 19. The associated and connecting sleeve 19 conducts the ID signal to the line interface and encoder 7 which thereby designates an identification of which station 2 is connected to the busy trunk 22. The identification uniquely identifies one of 1,800 sleeves 19.

The trunk interface 10, in addition to being utilized in line identification, functions, to indicate whether or not an addressed trunk circuit 5 is busy or not. The addressing of the trunk circuit 5 is by means of the control 253 which establishes a BCD trunk address (TA) on a 9-bits bus. The trunk address is input to the trunk interface 10 and is sequentially stepped so as to sample the busy condition of all of the trunks, one at a time, detecting the associated sleeve line 22. In a typical configuration, up to 150 trunk circuits 5 are available and each one is uniquely identified by a different BCD address.

Each time a busy trunk is detected, a sleeve busy signal SBZY* is communicated to the control 253 for updating a memory which has a corresponding location for each trunk. The trunk interface 10 additionally connects the signals on the 150 sets of tip and ring lines 20 and 21 to the multiplexer 11.

In FIG. 1, the multiplexer receives an analog line for each of the trunk circuits 5. In the example of FIG. 1, 150 trunk circuits 5 are present so that 150 analog lines are input to the multiplexer 11. The analog lines are input to the multiplexer 11 in groups of 10 indicated as 31-1 through 31-15. The function of the multiplexer 11 is to select one out of 150 of the input lines for connection to the output lines. The output lines include an analog line 34, a dial pulse (DP) line 37 and an answer detection (ANS) line 38. The selection for a sample duration of one of the 150 lines in the multiplexer 11 is under control of a 9-bit, BCD sample address (SA) which is stepped in common with a 6-bit receiver address (RA) both derived from the control 253.

In FIG. 1, the time division demultiplexer (TDM) 12 receives the analog line 34 from the multiplexer 11 and functions to time division demultiplex signals on line 34 out over the seven lines 35. The timing of the demultiplexer 12 is controlled by the three high-order bits of a receiver address (RA) which are derived from the control 253.

In FIG. 1, receiver (REC) unit 13 functions to receive and analyze information from the demultiplexer 12 and the multiplexer 11. Receiver unit 13 typically includes up to fifty receivers. Only one of the 50 receivers 13 is sampling at any one time. The operative receiver is designated by the 6-bit receiver address (RA) which is received from the control 253. A predetermined relationship is established between the sample address (SA) and the receiver address (RA) in the control 253 to associate a particular one of the fifty receivers 13 with a particular one of the trunk circuits 5. The information from the receivers 13 is output on a DIGIT bus (DB) which is connected to the fifty receivers 13 one at a time. The receivers 13 are of several different types. One type, a dial pulse receiver, is for detecting and counting dial pulses. Another type, an answer supervision receiver, is for detecting an answer supervision signal when the exchange 6 is of the type which has answer supervision. Another type, a multifrequency receiver, is for analyzing the signals in a touch calling multifrequency system. Another type, a ringback receiver, is for detecting the ringback tone and busy to determine a called-party answer.

In FIG. 1, the control 253 functions to control the other units by means of many control signals. When data is available from the receivers and other units, the control 253 transfers the data out over a memory data (MD) bus to a recirculating memory which is stepped in synchronism with the trunk address (TA). Output data appears on the memory data (MD) bus and that data relates to the trunk defined by the current trunk address. In the absence of new data, the data bus recirculates the old data for restorage into the memory. The memory is also connected to various I/O devices for transferring data out from the memory.

Figure 2:
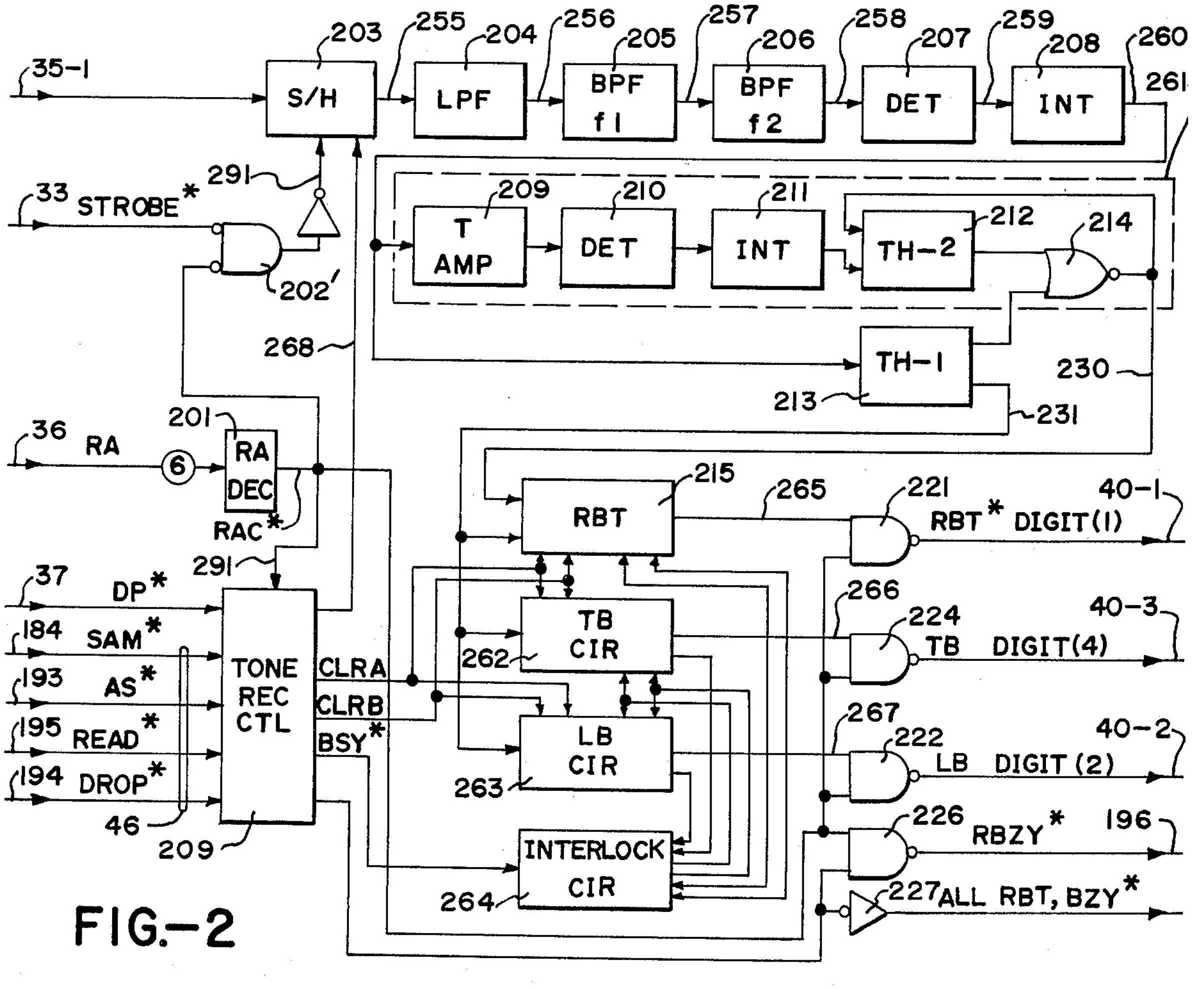
FIG. 2 depicts a schematic representation of a tone receiver which is one of fifty receivers of the FIG. 1 apparatus.

Tone Receiver — FIG. 2

In FIG. 2, the receiver shown is one of the fifty receivers 13 in FIG. 1 and is used to detect trunk busy, line busy and ringback tones. The trunk busy and line busy detection is used in connection with traffic analysis for indicating the frequency that attempted calls cannot be completed because of a busy condition. Also, the detection of trunk busy or line busy signals in connection with a call is used as an indication that the receiver of FIG. 2 can be immediately dropped and reassigned. The ringback tone detection is used in connection with commencing the timing of call duration. After a call has been dialed and a ringback tone is initially detected, the apparatus operates to commence timing the call duration whenever the ringback tone is no longer detected.

In FIG. 2, the tone receiver has an input from a line 35-1 which is received from the demultiplexing common equipment 12 of FIG. 1. The receiver of FIG. 2 is active only when addressed by a unique receiver address on the 6-bit receiver address (RA) bus 36 received from control 253. Bus 36 is input to the receiver address decoder 201 which functions to provide a unique output RAC* for only one address, of a possible $2^6$ addresses, on bus 36. Decoder 201 activates gate 202' at a time when an appropriate strobe pulse, STROBE* appears on line 33. The pulse on line 33 is derived from the control 253 in the manner indicated in the above-identified cross-referenced application. The receiver address in control 253 is cyclically stepped so that an output from decoder 201 occurs once each 100 microseconds. The STROBE* signal 1 to 0 transition occurs on line 33 approximately 1 microsecond after a 1 to 0 output occurs from decoder 201. A 0 for the strobe signal on line 33 is present for approximately 1 microsecond during the 0 time of RAC* and they function through gate 202' to control the sampling of line 35-1 in the sample and hold (S/H) circuit 203. The sample and hold circuit 203 functions to take a 1 microsecond sample of the signal on line 35-1 every 100 microseconds.

When the signal on line 35-1 is sampled by the circuit 203, it is stored across a capacitor and then propagated through filters 204, 205 and 206 to detector 207 and to integrator 208. An integrated signal output from the integrator 208 on line 260 is passed directly to a threshold detector (TH-1) 213. The circuits 203 through 208 and the threshold detector 213 perform an analog-to-digit conversion and provide a rectangular wave signal on line 231. The signal on line 231 has an on/off duty cycle which represents the on/off duty cycle of the signal on line 35-1 which has a frequency between 400 and 500Hz.

The output from the integrator 208 on line 260 also is input to a 40Hz detector 261 which is employed in connection with an alternate embodiment of the present invention. The 40Hz detector 261 includes a tuned amplifier 209 (having a center frequency of 40Hz and 36 and 44Hz 3db frequencies), a detector 210, an integrator 211 and a threshold detector (TH-2) 212. The 40Hz detector 261 provides an output whenever a 40Hz signal occurs on line 35-1.

The combined outputs of the threshold detectors 212 and 213 are input to the NOR which is input to the ringback tone measuring circuit 215. The signal is present on line 230 whenever a 40Hz signal is present as indicated by detector 212 and a signal between 400 and 500Hz is present as indicated by detector 213.

The rectangular wave signal on line 231 is input to each of the measuring circuits. The ringback tone measuring circuit 215 also receives the rectangular wave signal on line 230 for use in an alternate embodiment while the trunk busy measuring circuit 262 and the line busy measuring circuit 263 only employ the signal on line 231. The measuring circuits 215, 262 and 263 are interlocked by an interlock circuit 264.

The outputs from the measuring circuits 215, 262 and 263 appear on lines 265, 266 and 267, respectively. Those output lines are in turn connected to NAND gates 211, 224 and 222, respectively, which have as their other inputs the receiver address decode output RAC* from decoder 201. The gates 221, 224 and 222, when energized by a signal from decoder 201, provide the ringback tone, trunk busy, and line busy signals on the digit bus lines 40-1, 40-3, 40-2, respectively. These outputs are in turn detected in FIG. 1 by the control 253 in the manner previously indicated in connection with the above-identified cross-referenced application.

Figure 3:
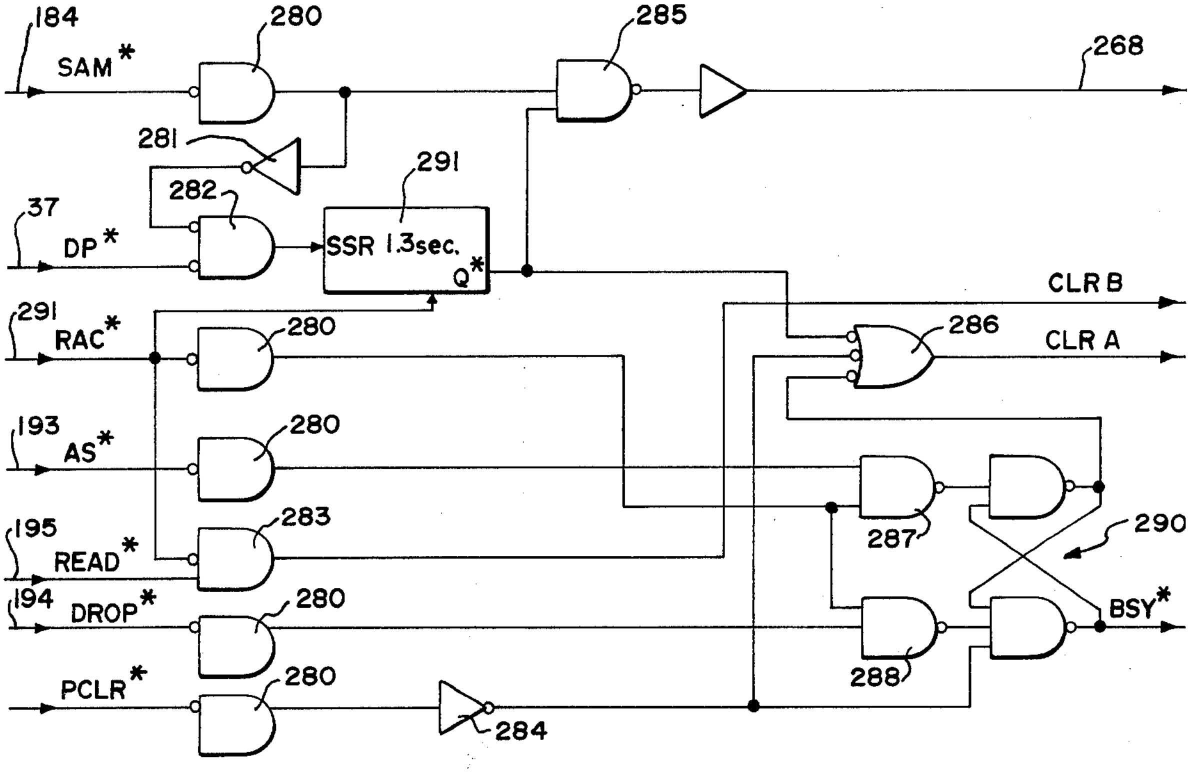
FIG. 3 depicts a schematic representation of the tone receiver control of the tone receiver of FIG. 2.

Tone Receiver Control — FIG. 3

In FIG. 3, further details of the tone receiver control 209 in FIG. 2 are shown. All of the input signals indicated along the left-hand margin are received from the control 253 of FIG. 1 except the RAC* line 291 which is received from the receiver address decoder 201 of FIG. 2. The SAM* signal on line 184 is input through an inverting gate 280 to the NAND gate 285 and through an inverter 281 to the NOR gate 282. Gate 282 functions to detect a 1 to 0 transition for the SAM* signal when the DP* signal is 1 and thereby responsively triggers the retriggerable single shot 291. The single shot 291 has a delay of approximately 0.3 second. The 291Q* output from single shot 291 connects as an input to NAND gate 285 and the NAND gate 286. The function of single shot 291 is to inhibit the sample signal from being transmitted to line 268 until after the last dial pulse occurs as indicated by the DP* signal on line 37. The DP* signal is generated by the control 253 as 0 until seven dial pulses have occurred in the case of local calls or until ten dial pulses have occured in the case of long distance calls. After the last dial pulse, either the seventh or tenth pulse, DP* goes to 1. The ringback tone commences generally anywhere from one second to twenty seconds after the last dial pulse. By inhibiting the sampling signal on line 268 single shot 291 prevents the relatively high magnitude dial pulses from being introduced into the analog-to-digital portion of the tone receiver of FIG. 2. Additionally, when the single shot has a 0 to 1 transition on its Q* output, gate 286 looses its 0 input and switches the CLRA signal to 0 provided no other 0 inputs are connected to gate 286. Gate 286 also receives an input from the PCLR* line which is used in connection with power clearing. For purposes of the present invention, the PCLR* input to gate 286 can be ignored by assuming that it always provides aa 1 input to gate 286. The third input to gate 286 is derived from the busy latch 290. The busy latch 290 is set to store a 0 whenever the tone receiver of FIG. 2 has not been assigned. The 0 input to gate 286 forces the CLRA output to a 1 holding the receiver of FIG. 2 in the cleared state. Whenever the receiver of FIG. 2 is to be assigned, a 0 for the AS* signal is input through inverter 280 to NAND gate 287. Gate 287 upon receipt of that assignment signal, at a time when RAC* is 0, provides an output which forces latch 290 to store a 1. That 1 is then input to gate 286 and, provided that all other inputs to gate 286 are a 1, removes the clear by forcing CLRA to 0. With latch 290 set, the BSY* output is a 0 indicating the busy condition of the tone receiver of FIG. 2. Latch 290 is reset to 0 either by operation of PCLR* signal or by NAND gate 288. Gate 288 is operative whenever the signals RAC* and DROP* are both 0. The input DROP* signal is inverted in inverter 280 and input to the gate 288.

In detecting the presence or absence of trunk busy, line busy and ringback tones, the tone receiver of FIG. 2 stores that information in flip-flops. The flip-flops connect to gates which are interrogated at a READ* signal time. Gate 283, provides an output, whenever RAC* is 0, in response to the 0 READ* signal which then functions to produce a 1 or the CLRB signal. The CLRB 1 functions to clear the flip-flops of the tone receiver of FIG. 2 in readiness for the next determination. The clearing function also enables the counting of ringback tones.

Figure 4:
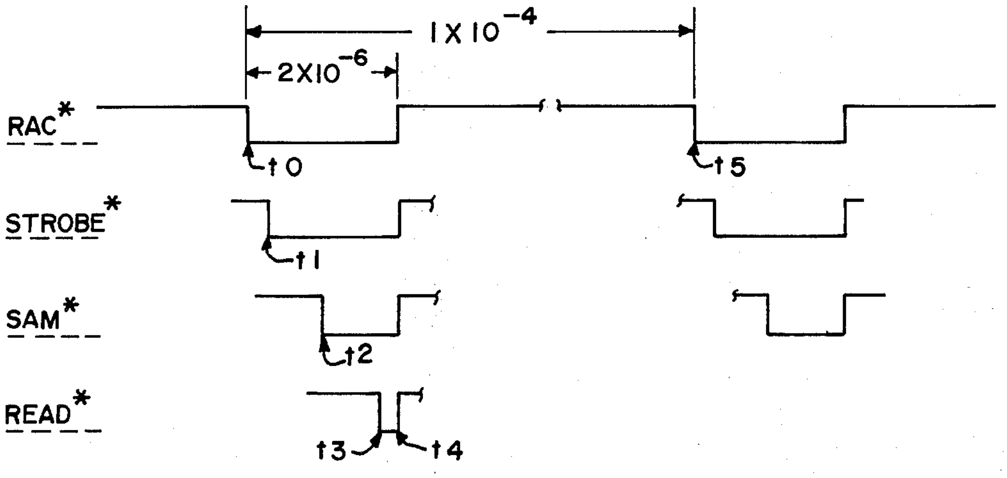
FIG. 4 depicts a representation of the control signals utilized in the tone control of FIG. 3.

Tone Receiver Control Timing — FIG. 4

In FIG. 4, the timing relationship of waveforms RAC*, STROBE*, SAM*, READ* are shown. The basic timing for the RAC* pulses is one pulse every $1\times10^{-4}$ second for a pulse duration of $2\times10^{-6}$ second. A 0 STROBE* pulse occurs at *t*1 a short duration after the initiation of RAC* at *t*0. The sample signal SAM* 0 occurs at *t*2 about 1 microsecond after the *t*0. The 0 READ* signal occurs between *t*3 and *t*4 for a short duration at the end of the RAC* pulse which occurs at *t*4. The read pulse occurs only at the appropriate trunk memory time so that data can be transferred to the trunk memory. Read pulses do not therefore appear during each RAC* pulse but once every RAC* period where that period is in the range between 20 and 40 milliseconds.

Figure 5:
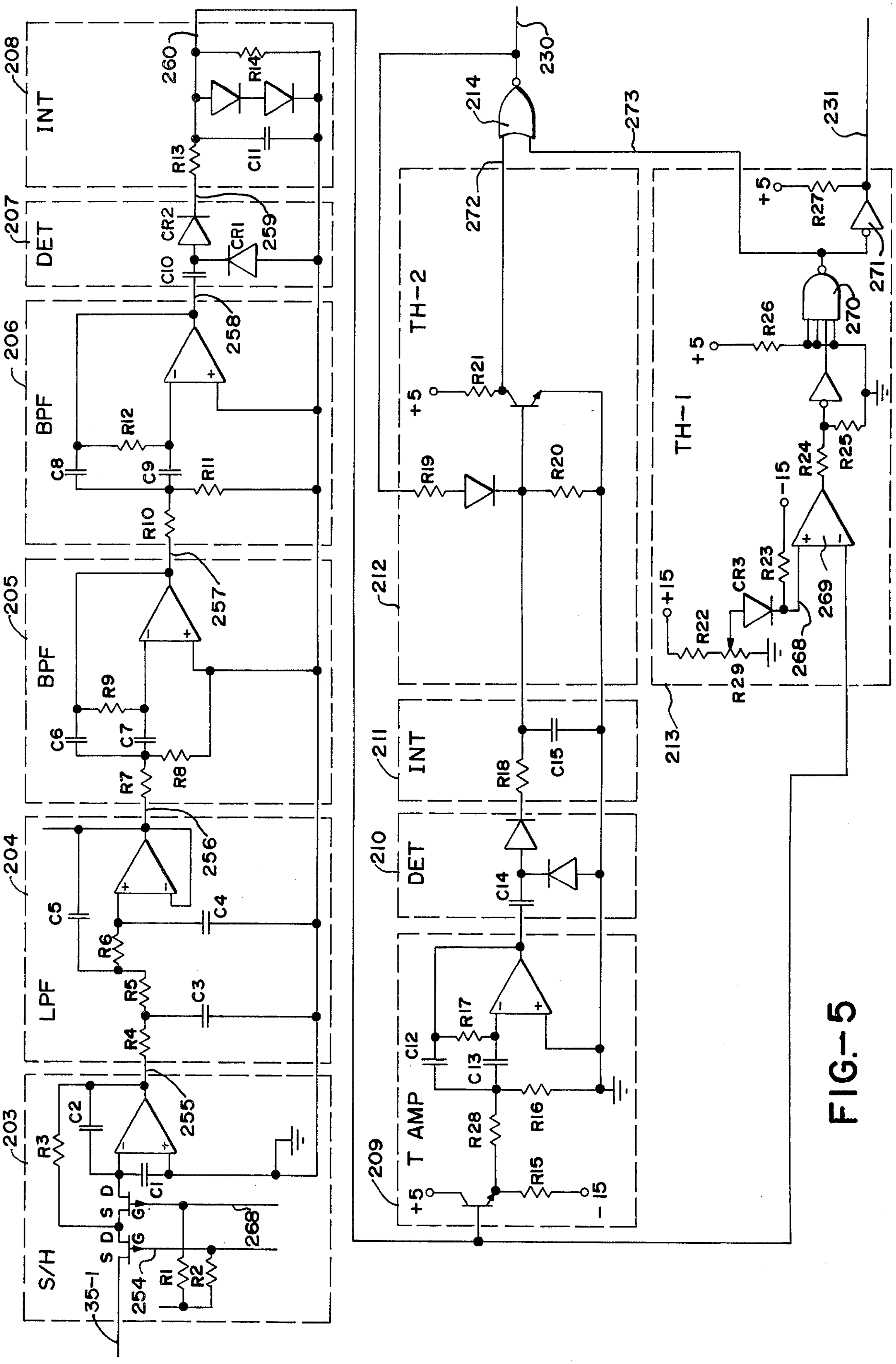
FIG. 5 depicts a schematic representation of the analog-to-digital of the tone receiver of FIG. 2.

Tone Analog-To-Digital Converter — FIG. 5

In FIG. 5, the analog-to-digital converter portion of the ringback tone measuring circuit of FIG. 2 is shown in further detail. The sample and hold circuitry 203 includes two series connected field effect transistors which receive as their source the analog line 35-1. When rendered conducting by the signals on lines 254 and 268, the analog signal from line 35-1 is input to a differential amplifier. The holding capacitor C2 stores the value representing the accumulated samples of the signal on line 35-1 and responsively provides an output on line 255. The signal on line 255 is an AC signal with a staircase waveform where the steps are the result of sampling. The output on line 255 is input to the lowpass filter 204 which provides a filtered output on line 256. Filter 204 has a cut-off frequency of approximately 2,000Hz and functions principally to remove the steps in the waveform on line 255.

The filtered signal on line 256 is input to the bandpass filter 205 which has a center frequency of approximately 440Hz with the 3db points at approximately 400Hz and 4801 Hz. The function of the filter 205 is to provide good detection of 440Hz signals which are input on line 35-1. The output from bandpass filter 205 appears on line 257 as an input to the bandpass filter 206.

Filter 206 has a center frequency of approximately 480Hz with three db points at 430Hz and 530Hz. The function of filter 206 is to provide good detection of 480Hz signals which are input on line 35-1. The combined function of the bandpass filters 205 and 206 is to provide good detection of input signals on line 35-1 between 400Hz and 530Hz and provide an accurate analog representation thereof on line 258. The signal on line 258 is substantially symmetrical around 0 volts. The peak-to-peak voltage at line 258 (in the absence of a ringback, line busy, or trunk busy tone on line 35-1) is less than 0.5 volt. With the presence of one of the tones, however, the peak-to-peak amplitude of the signal on line 258 is greater than 0.5 volt but is clamped not to exceed 10 volts.

The detector 207 receives the filtered signal on line 258 and functions to shift the 0 volt bias to a bias greater than 0.5 volt so as to provide an appropriate input on line 259 for the integrator 208. The integrator 208 functions to convert the signal on line 259 to a DC level (which may include a 40Hz ripple) on output line 260 which is then threshold detected in the threshold detector 213.

The integrated signal on line 260 is compared with an approximately +500 millivolt reference on line 268 to provide a plus or minus 12 volt output from the amplifier 269. The +12 volt signal represents a logical 1 and the −12 volt represents a logical 0. A logical 0 indicates the presence and a 1 and represents the absence of a busy or ringback tone signal within the frequency passband of the analog section. The ±12 volt swing from amplifier 269 is shifted to an appropriate swing range so as to provide logical 1 and 0 inputs to the NAND gate 270. Gate 270 functions to invert the logical sense of the output from amplifier 269 which is in turn again inverted in the inverter 271 to provide a digital positive true signal on line 231 representing the presence or absence of the ringback or busy signals.

The signal on line 260 is also input to the amplifier 209 which in turn is input to the detector 210 and the integrator 211 and finally to the threshold circuit 212. The function of the circuits 209 through 212 is to detect the presence of any 40Hz signal on the line 260 and responsively to provide an input on line 272 to the NOR gate 214. Gate 214 also receives an input on line 273 which is a complement of the signal on line 231. Line 230 has a logical 1 output whenever the line 272 indicates that a 40-cycle signal is present and line 273 indicates that one or more of the 440Hz and 480Hz signals is present. The output signals on lines 230 and 231 are input to the measuring circuits.

The values of the resistors and capacitors in FIG. 3 are indicated in the following CHART I:

CHART I

| | | | | | | |
|---|---|---|---|---|---|---|
| C1 | = | 200pf | R1 | = | 1 | K ohm |
| C2 | = | 43 | R2 | = | 1 | K |
| C3 | = | 820 | R3 | = | 5.1 | K |
| C4 | = | 134 | R4 | = | 100 | K |
| C5 | = | 2000 | R5 | = | 100 | K |
| C6 | = | $3.3\times10^4$ | R6 | = | 100 | K |
| C7 | = | $3.3\times10^4$ | R7 | = | 2.21 | K |
| C8 | = | $3.3\times10^4$ | R8 | = | 750 | |
| C9 | = | $3.3\times10^4$ | R9 | = | 221 | K |
| C10 | = | $1\times10^5$ | R10 | = | 22.1 | K |
| C11 | = | $4.7\times10^6$ | R11 | = | 562 | |
| C12 | = | $3.3\times10^4$ | R12 | = | 221 | K |
| C13 | = | $3.3\times10^4$ | R13 | = | 1 | K |
| C14 | = | $1\times10^5$ | R14 | = | 10 | K |
| C15 | = | $4.7\times10^6$ | R15 | = | 10 | K |
| | | | R16 | = | 806 | |
| | | | R17 | = | 240 | K |
| | | | R18 | = | 1 | K |
| | | | R19 | = | 5.1 | K |
| | | | R20 | = | 10 | K |
| | | | R21 | = | 4.7 | K |
| | | | R22 | = | 100 | K |
| | | | R23 | = | $1\times10^3$ | K |
| | | | R24 | = | 10 | K |
| | | | R25 | = | 4.7 | K |
| | | | R26 | = | 1 | K |
| | | | R27 | = | 1 | K |

-continued

CHART I

| | | |
|---|---|---|
| R28 | = | 2.4 K |
| R29 | = | 10 K |

Figure 6:
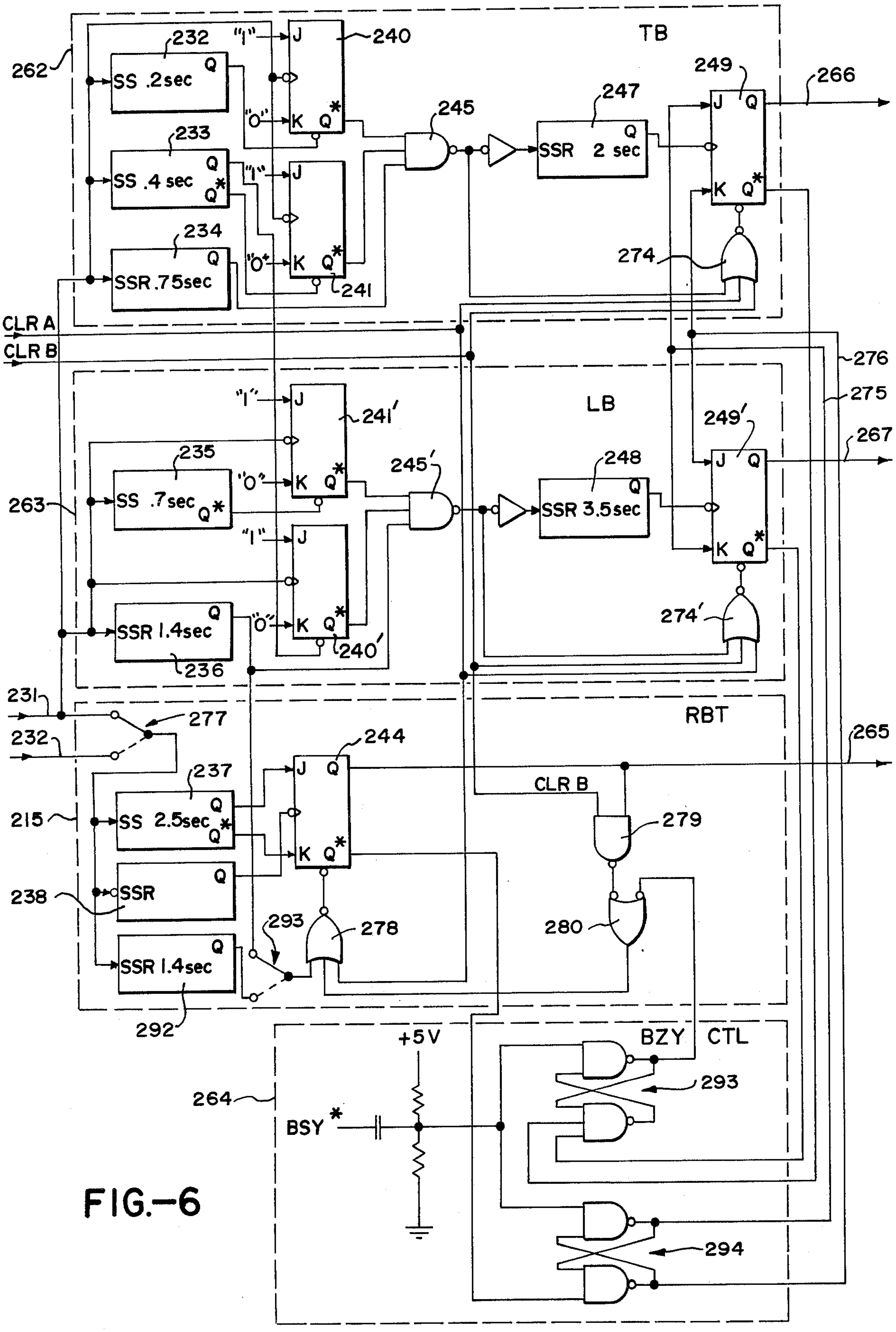
FIG. 6 depicts the turn-on and turn-off detecting circuitry for use and detecting the presence or the absence of the trunk busy, line busy and ringback tones in the apparatus of FIG. 1.

Tone Digital Measuring Circuits — FIG. 6

In FIG. 6, the trunk busy measuring circuit 262 and the single shots 232, 233 and 234 receive the signal on line 231. Single shot 232 is non-retriggerable and produces a 1 on its Q output for positive going transitions on line 231. Once an input positive going transition has been received, single shot 232 will not retrigger until output 232Q has first fallen. Single shot 232 provides aa 1 on its Q output for a duration of 0.2 second after a positive going transition on line 231. Single shot 232 also has a Q* output which is the complement of its Q output. The output 232Q connects to the clear input of a JK flip-flop 240. Flip-flop 240 has a clock input from line 231 which is operative to clock flip-flop 240 with negative going transitions on line 231. The J and K inputs of flip-flop 240 are tied to 1 and 0, respectively. Provided flip-flop 240 is not held cleared to a 1 on 240Q* by a 0 on 232Q, flip-flop 240 will switch its Q* output to a 0 whenever a negative going transition occurs on line 231.

Single shot 232 functions to hold flip-flop 240 cleared only after a 0.2 second duration. If the negative going edge of the tone pulse on line 231 occurs prior to the 0.2 second time, then that negative going edge will clock flip-flop 240 and hence the output 240Q* will switch to 0. In this manner, flip-flop 232 ensures that the duration of any pulse which clocks flip-flop 240 will be less than 0.2 second.

Single shot 233 is non-retriggerable and has its Q* output connected as the clear input to flip-flop 241 and functions to hold flip-flop 241 in the clear state for 0.4 second after a positive going transition on line 231. Any pulse which has a negative going transition more than 0.4 second after its positive going transition will clock flip-flop 241 to produce a 0 on 241Q*.

The Q* outputs from both flip-flops 240 and 241 are input to NAND gate 245. Gate 245 becomes satisfied to provide a 0 output only if all three inputs are 1 's. Both flip-flops 240 and 241 will be held in the cleared state with the 240Q* and 241Q* inputs to gate 245 both 1 's if the negative going transition of the pulse on line 231 is between 0.2 and 0.4 second. If the negative going transition is earlier than 0.2 second then flip-flop 240 will have its Q* output clocked to a 0 or if the negative going transition is after 0.4 second then flip-flop 241 will have its Q* output clocked to 0. If either of these conditions occurs, then the output of gate 245 will be forced to a 1. The third input to gate 245 is derived from a retriggerable single shot 234, Each positive going transition input to single shot 234 causes the 234Q output to be a 1 for 0.75 second. If the input transitions do not occur at least as often as every 0.75 second, the 234Q output from single shot 234 will drop to a 0 thereby forcing the output of gate 245 to a 1.

Provided the negative going transitions on line 231 are occurring between 0.2 second and 0.4 second and the pulses are coming at a rate of at least one every 0.75 second, gate 245 has a 0 output which through, NOR gate 274 is connected to the clear input of JK flip-flop 249. Under these conditions, flip-flop 249 is not held cleared and can be switched by the operation of a negative going pulse from the single shot 247. Single shot 247 is triggered by a negative going transition from gate 245 and will provide a negative going output 2 seconds after the last positive going input. The negative going transition after 2 seconds will clock the flip-flop 249 and produce 1 on output line 266 provided the J and K inputs on lines 275 and 276 from the interlock circuit 264 are 1 and 0, respectively.

In summary, the measuring circuit 262 detects the presence of pulses between 0.2 second and 0.4 second wide occuring at a rate of at least one every 0.75 second and provides a logical 1 output on line 266 after pulses of this nature have occurred for a duration of 2 seconds. If the pulses are not occurring as frequently as every 0.75 second as determined by single shot 234, or a pulse is wider than 0.4 second as determined by single shot 233, or a pulse is shorter than 0.2 second as determined by single shot 232, the output from gate 245 will be forced to a 1 which will be inverted in NOR gate 274 forcing flip-flop 249 to a clear condition with a 0 on output line 266. The flip-flop 249 is also clear by the signal CLRA and the signal CLRB which are derived from the tone control 209 in FIG. 2.

In FIG. 6, the line busy measuring circuit is substantially indentical to the trunk busy measuring circuit 262 except that the time out duration of the single shots is different. Single shot 235 discriminates against pulses which have a pulse with longer than 0.7 second. The Q output of single shot 232 in the trunk busy circuit is employed in the line busy circuit to detect pulses which are shorter than 0.4 second. The Q* output of single shot 235 connects to the clear input of flip-flop 245'. The Q output of single shot 233 connects to the clear input of flip-flop 241'. The single shots 233 and 235 in combination with the flip-flops 240' and 241' discriminate against pulse widths which are not in the range between 0.4 second and 0.7 second. Retriggerable single shot 236 has a duration of 1.4 seconds and determines that pulses occur at least as frequently as every 1.4 seconds. The operation of gate 245' is analogous to that of gate 245. The retriggerable single shot 248 is operative to detect the presence of the desired pulses for 3.5 seconds. Whenever such pulses have been present for 3.5 seconds, the flip-flop 249' is switched to provide a 1 on the Q output line 267, provided the interlock signals provide a 1 and a 0 to the J and K inputs, respectively.

In FIG. 6, the ringback tone measuring circuit 215 receives the signal on line 231 and connects it through the switch 277 to the single shots 237 and 238. In an alternate mode, the switch 277 can be switched to the line 232 in which case the 40Hz detector 261 in FIG. 2 is utilized. When ever switch 277 is switched to the position connecting to line 232, a duplicate retriggerable single shot 292, like single shot 236, is utilized within the measuring circuit 215 and is connected by switch 292 in order to provide an input to the NOR gate 278.

In the embodiment shown with switch 277 connected to the line 231, positive going pulses on line 231 are operative to trigger the single shot 237. The single shot 237 has its output Q go to a 1 and its output Q* go to a 0 for a duration of 2.5 seconds after a positive going transition. The retriggerable single shot 238 is triggered by negative going pulses on line 231 and has a short time out of less than 1 microsecond. The Q output from single shot 238 clocks the JK flip-flop 244 shortly after the negative going transition on line 231. If at the time that single shot 238 clocks flip-flop 244 less than 2.5 seconds have elapsed since the time of the positive going transition, the 244Q output will be clocked to 1 thereby indicating the presence of a ringback tone. If, however, the negative going transition on line 215 is later than 2.5 seconds, the 244Q is output clocked 0 thereby indicating the absence of a ringback tone.

If the pulse on line 231 is less than 1.4 seconds, the retriggerable single shot 236 via its Q output will hold the flip-flop 244 cleared through the NOR gate 278 at the time the clock signal from single shot 238 occurs thereby not allowing flip-flop 244 to be clocked so that a 0 on 244Q indicates the absence of a ringback tone. Flip-flop 244 is also cleared by the operation of the busy control 264 through the gate 280 and gate 278 or by the operation of the CLRB signal through gate 279, gate 280 and gate 278.

Figure 7:
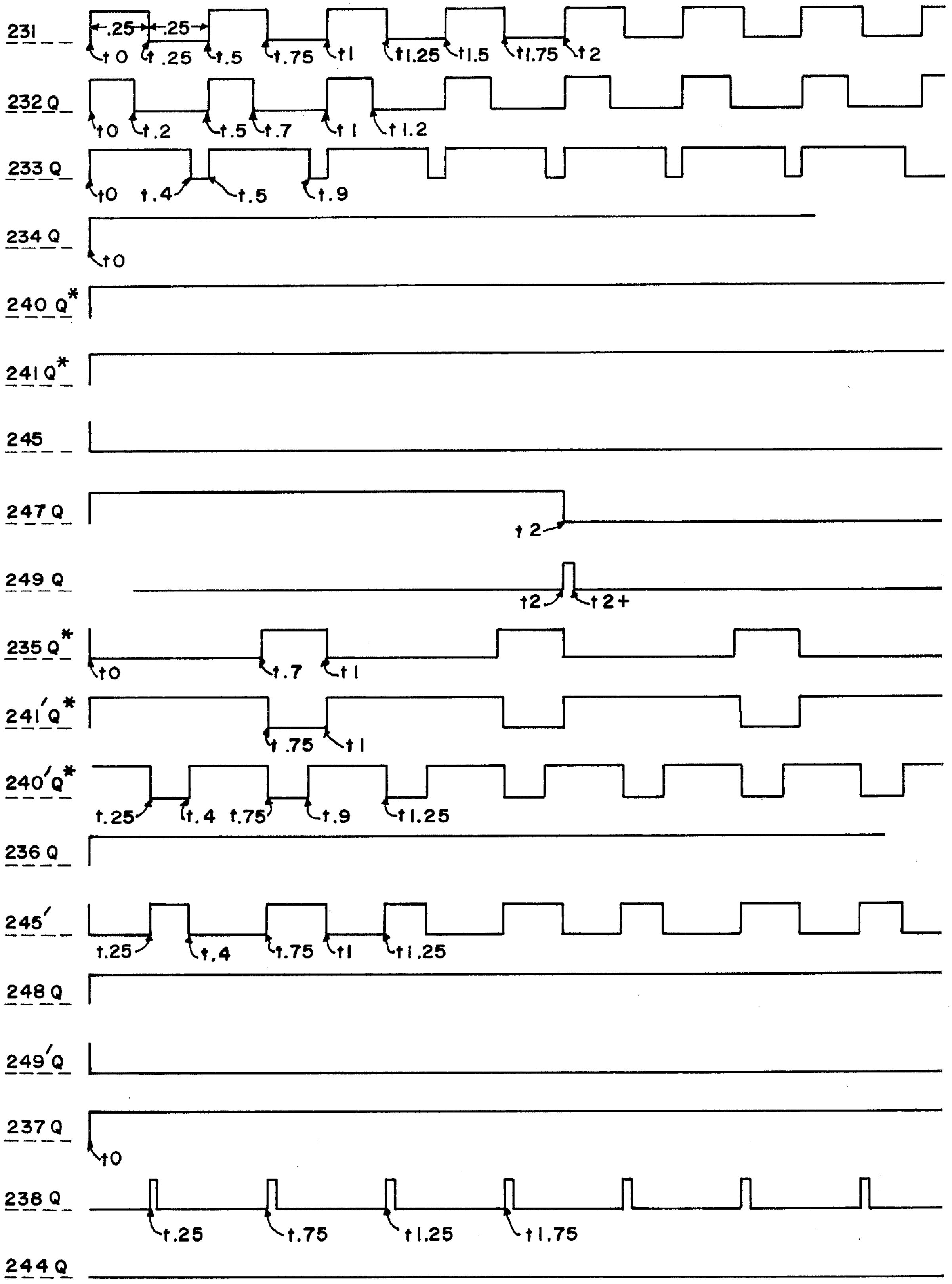
FIG. 7 depicts typical waveforms representative of the operation of the timing circuitry of FIG. 4.

Trunk Busy Detection — FIG. 7

In FIG. 7, the waveform 231 has a 0.25 second on time and a 0.25 second off time. This waveform is representative of the signal on line 231 in FIG. 5 when a ringback tone is present on line 35-1 of FIG. 5. The signal on line 231 indicates that a signal is present on line 35-1 which typically includes signals of frequency 420Hz and 480Hz which are on for a 0.25 second periods and off for 0.25 second periods.

In FIG. 7, the first detected trunk busy pulse commences with a positive going transition at *t*0 and follows with a negative going transition at *t*.25. Similarly, there are positive going transitions at *t*.5, *t*1, *t*1.5, *t*2 and so on. There are negative going transitions at *t*.75, *t*1.25, *t*1.75 and so on. In response to the positive going transitions, each of the single shot outputs 232Q, 233Q, 234Q, 235Q*, 236Q, and 237Q each have a responsive transition at *t*0. The termination of the pulse on 232Q occurs after a pulse duration of 0.2 second at time *t*.2. The next pulse on line 231 at *t*.5 causes another pulse to be initiated on 232Q at *t*.5 which again terminates in 0.2 second at *t*.7. Any negative going transition on line 231 which occurs while line 232Q is positive is free to trigger the flip-flop 240. Therefore, the single shot 232 and the flip-flop 240 together comprise means for detecting whenever the pulse width of a pulse on line 231 is less than a lower limit, namely 0.2 second in the present instance.

The pulse on line 233Q which was initiated at *t*0 is terminated after 0.4 second at *t*.4. Any negative going transition which occurs while 233Q is a 0, that is while 233Q* is a 1 (as occurs for example between *t*.4 and *t*.5) will clock the flip-flop 241. The single shot 233 and the flip-flop 241 and therefore, means for detecting whenever a pulse width of a pulse on line 231 is greater than a maximum limit, namely greater than 0.4 second in the present instance.

Since the pulse widths of the pulses on line 231 are between the lower limit of 0.2 second and the upper limit of 0.4 second, neither of the flip-flop 240 and 241 are clocked. Accordingly, the outputs 240Q* and 241Q* remain as 1's. Similarly, the retriggerable single shot 234 is continually retriggered on each positive going transition of line 231 so that the output 234Q remains a 1. Since the time duration of single shot 234 is 0.75 second, and the pulses on line 231 in FIG. 7 are occurring every 0.5 second, no transition occurs in the output 234Q.

With all 1 inputs to NAND gate 245, the output of gate 245 is 0 from the time that 234Q goes to 1 at *t*0. At *t*0 the output of gate 245 has a 1 to 0 transition which is inverted in gate 274 to a 0 to 1 transition removing the clear input on flip-flop 249. The 1 to 0 transition from gate 245 is inverted and input to single shot 247 causing 247Q to have a 0 to 1 transition at *t*0. After the 2 second time out of single shot 247, 247Q has a negative going transition which clocks flip-flop 249. Because of the 1 and 0 input on J249 and K249, respectively, 249Q has a 0 to 1 transition at *t*2 in response to the 247Q clock input. This signal on 249Q connects to line 266 and signifies that the trunk busy tone has been detected.

The output of flip-flop 249Q remains a 1 until a READ* pulse causes a 1 to be generated for the CLRB signal. Since a READ* pulse normally occurs every 20 milliseconds, the one level of 249Q is detected in not more than 20 milliseconds after *t*2 at a time generally designated *t*2+. At *t*2+, flip-flop 249Q is cleared causing a 0 on output 249Q. Flip-flop 249 is not clocked again, however, because no transitions occur output from single shot 247 as long as the trunk busy tone signal appears on line 231. After detection of the trunk busy signal has been noted by control 253 in FIG. 1, the receiver of FIG. 2 becomes available for reassignment.

While the trunk busy circuit 262 functions to detect the trunk busy tone on line 231, the line busy measuring circuit 263 is also functioning to detect whether or not a line busy pulse is present on line 231. A line busy signal is generally one having a pulse of 0.5 second on and 0.5 second off. Since the FIG. 7 example is 0.25 second on and off, circuit 263 does not detect a line busy signal as now explained.

In response to the positive going transitions on line 231, the single shot output 235Q* has a negative going transition at *t*0 and remains at 0 for the 0.7 second time out causing a positive going transition at *t*.7. Whenever 235Q* is a 1, for example between 0.7 and *t*1, flip-flop 241' can be clocked by a negative going transition on line 231. Since there is a transition on line 231 at *t*.75, 241'Q* is switched from 1 to 0 at *t*.75 and it is thereafter cleared to 1 at *t*1. The function of single shot 235 and flip-flop 241' is to detect the upper limit transition of pulses which have a pulse width greater than 0.7 second.

Flip-flop 240' receives its clear input from the single shot 233 in the trunk busy circuit 262. The function of the 233Q output and flip-flop 240' is to detect the lower limit transition of pulses which have a pulse width less than 0.4 second. Any pulse having a negative going transition less than 0.4 second clocks the flip-flop 240' to produce 0 on 240'Q*. Since the waveform 231 has a negative going transition at *t*.25 which is prior to *t*.3, 240'Q* has a negative going transition at *t*.25 and is cleared to 1 at *t*.4. the negative going transitions on line 231 continually clock the flip-flops 241' and 240' and thereafter they are cleared to produce transitions which are propagated through NAND gate 245'. These transitions occur more frequently than every 2.5 seconds, for example at *t*.25, *t*.75, *t*1.25 and so forth so that the retriggerable single shot 248 continually has a 1 on its output 248Q as long as the pulses are present on line 231. The one level on 248Q does not clock the flip-flop 249' so that the output on 249'Q remains a 0 as initially established by the clearing operation of gate 274'. Since the pulses on line 231 are occurring at a rate greater than every 1.4 seconds, the Q output from single shot 236 remains a 1, but the output 236Q does not alter the transitions of flip-flops 241' and 240' and the switching of gate 245'.

Although the pulse width of the pulses on line 231 are only 0.25 second, the upper limit detector (single shot 235 and the flip-flop 241') still produces an output even though the upper limit is 0.7 second. The reason for this output is that the upper limit detection is only valid for pulse widths between the upper limit and the upper limit divided by 2. In the present case the upper limit divided by 2 is 0.35 second. The effective pulse width detection of the upper limit portion of circuit 263 is for pulse widths between 0.35 and 0.7 second.

The switching of flip-flops 241' and 240' causes the output from gate 245' to switch at a rate which is faster than the 3.5 second time out of single shot 248. The first triggering of single shot 248 occurs at *t*0 and results in output 248Q remaining 1 so that flip-flop 249' is never clocked as long as the line busy tone is not detected. Accordingly, the output 249'Q remains as 0 indicating the absence of a line busy signal.

The signal on line 231 is also input to the ringback tone measuring circuit 215. The positive going transition at *t*0 of the signal on line 231 caauses the output 237Q to be 1 from *t*0 until *t*2.5. At *t*2.5, a race condition occurs and single shot 237 may or may not be triggered by the positive going pulse at *t*2.5 on line 231. If it is, then 237Q remains a 1 and if it is not, *t*237Q is again a 1 at *t*3. In FIG. 7, 237Q is arbitrarily shown as remaining at 1.

The negative going transitions of the waveform 231 are operative to trigger the retriggerable single shot 238 as occurs, for example at *t*.25, *t*.75, *t*1.25 and so on. Because the pulses on line 231 are occurring greater than every 1.4 seconds, the retriggerable single shot 236 in the line busy measuring circuit has an output which is continually a 1. That 1 is connected through switch 293 to the NOR gate 278 to hold continuously the flip-flop 244 in the cleared state. With the output 244Q a 0, line 265 reflects the absence of a ringback tone.

Figure 8:
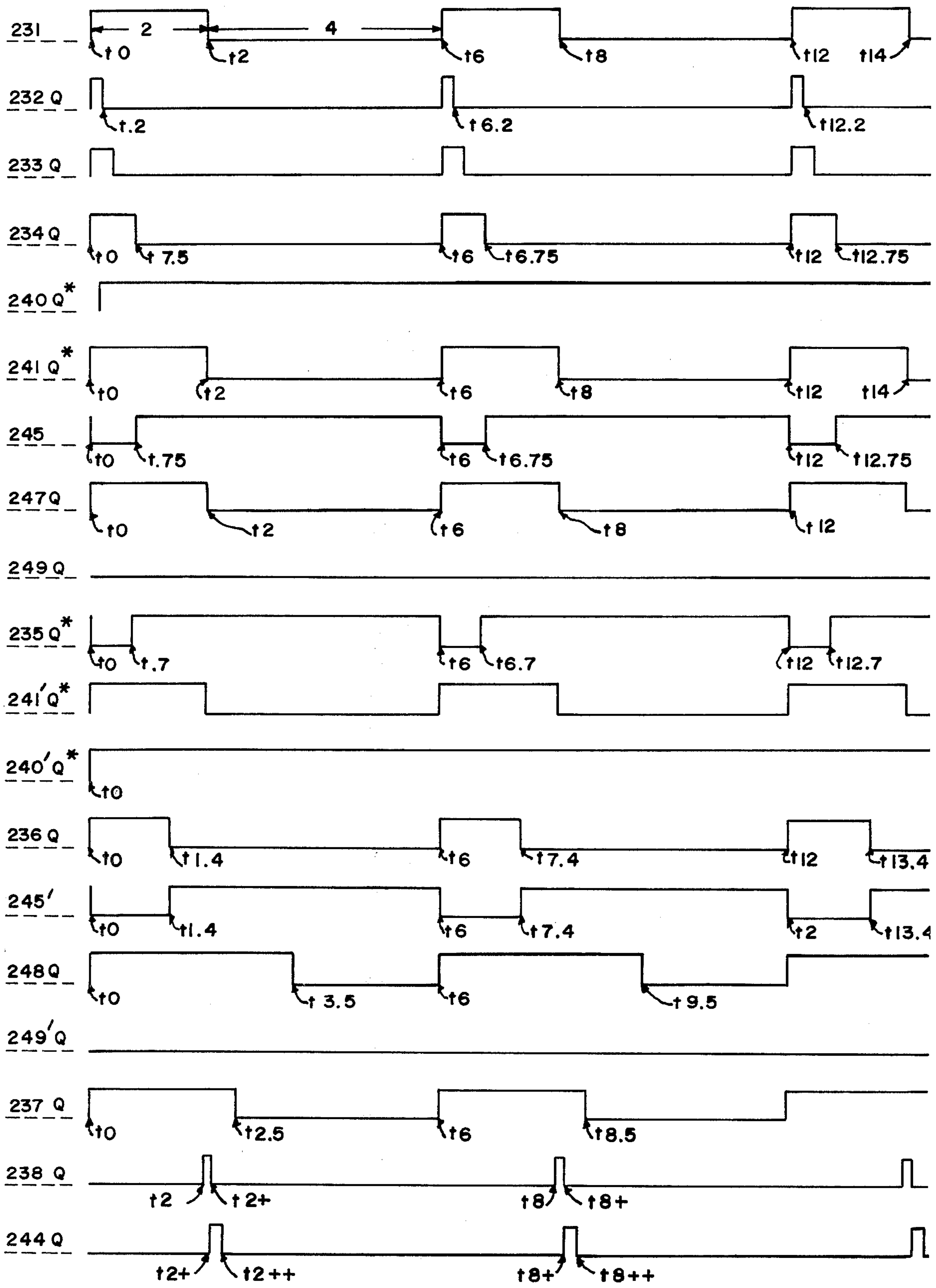
FIG. 8 depicts another typical operation of the timing circuitry of FIG. 4.

Ringback Tone Detection — FIG. 8

In FIG. 8, line 231 reflects a typical ringback tone having a duration of two seconds on and four seconds off. The waveform has positive going transitions at *t*0, *t*6 and *t*12 and negative going transitions at *t*2, *t*8 and *t*14. That signal on line 231 is input to the single shots of the trunk busy measuring circuit 262, the line busy measuring circuit 263, and the ringback tone measuring circuit 215. In the circuit 262, no negative going transitions occur in waveform 231 during the time that the output 232Q is a 1 and therefore the output 240Q* is continuously a 1 after *t*0.

In circuit 262 during the period when 233Q* is a 1 (233Q is a 0), the negative going transitions at *t*2, *t*8 and *t*14 of waveform 231 clock flip-flop 241 to produce 0 on 241Q* until flip-flop 241 is again cleared. Flip-flop 241 is cleared to produce on a 1 on the output 241Q* in response to the positive going transitions in waveform 231 at *t*0, *t*6 and *t*12. Gate 245 responsively has 0 going transitions at *t*0, *t*6 and *t*12 which cause the single shot 247 to have similar positive going transitions to produce 0 output on 247Q. The 0 output on 247Q returns negative in each case after the 2 second time out of single shot 247 which occurs at *t*2, *t*8 and so on. Since the output from gate 245 is a 1 at times when 247Q goes negative, the 1 is inverted in gate 274 to hold flip-flop 249 continuously clear to produce 0 on output 249Q thereby indicating the absence of a trunk busy signal.

The signal on line 231 is also input to the line busy measuring circuit 263. In the FIG. 8 example, the negative going transitions on line 231 occur when the output 235Q is 1. Therefore,the 241'Q* output has negative going transitions at *t*2, *t*8 and *t*14. Flip-flop 240' does not have transitions on its Q* output since the output 233Q holds flip-flop 240' continuously cleared. The output 236Q has positive going transitions which follow the positive going transition on line 231 at *t*0, *t*6 and *t*12 and has negative going transitions after the 1.4 second time out at *t*1.4, *t*7.4 and *t*13.4. The gate 245 has transitions at *t*1.4, *t*7.4 and *t*13.4 in response to the transitions of single shot 236. Although the single shot 248 responsively has transitions which provide negative going clock inputs on 248Q to the flip-flop 249', the operation of gate 274' holds flip-flop 249' cleared whenever a negative going transition appears on 248Q. Accordingly, the output 249'Q is continuously 0 so that the signal on line 267 indicates the absence of a line busy tone.

The signal on line 231 is also input to the ringback tone measuring circuit 215. The single shot 237 is energized so that the output 237Q is 1 between *t*0 and the time out at *t*2.5. The negative going transition on line 231 at *t*2 causes a pulse output from the retriggerable single shot 238, the trailing edge of which at *t*2+ causes flip-flop 244 to be clocked. Since 237Q is a 1 and 237Q is a 0 at this time. The output 244Q is clocked to a 1 at *t*2+ thereby indicating the presence of a ringback tone. Within 20 milliseconds after *t*2+, a CLRB signal input to gate 279 will cause a 0 output from gate 279 whenever 244Q is a 1. That 0 from gate 279 is propagated through gate 280 and gate 278 to clear flip-flop 244 at time *t*2++ after the ringback tone has been detected by control 253 in the system of FIG. 1.

The function of the busy control 264 is the store in busy latches 293 and 294 the first one (line or trunk busy or ringback) to be detected and thereby inhibit detection of any other tone. Latch 293 is set either by the output 249Q* or the output 249Q* to thereby indicate the detection of either a trunk busy or a line busy condition. When latch 293 is set, its output to gate 280 and in turn to gate 278 holds flip-flop 244 cleared. Similarly, the first detection of a ringback tone sets latch 294 by the operation of the output **244Q*. With latch 294 set, the flip-flops 249 and 249' are presented with a 0 and a 1 on the J and K inputs, respectively. With these inputs flip-flops 249 and 249'** are prevented from being set to indicate a trunk busy or a line busy condition. A BSY* signal, which occurs as indicated in connection with FIG. 3 when the receiver is first assigned.

FURTHER AND OTHER EMBODIMENTS

While in FIG. 6, the means for sensing pulse widths of the rectangular wave signals employs single shots, other timing devices can, of course, be employed. For example, referring to FIG. 6, single shot 232 in an alternate embodiment can be replaced by a counter and decoder. The counter is stepped by uniform clock pulses and the decoder is employed to decode a count which represents 0.2 second. Similarly, a second counter in combination with a second decoder can be employed to carry out the function of single shot 233. The second decoder decodes a count which represents 0.3 second. Additional flip-flops can be employed, for example, which are set by signals on line 231 and thereafter are reset by the timed outputs of the 0.2 second and 0.3 second decoders. The outputs from these added flip-flops are then in turn connected directly to the flip-flops 240 and 241. The retriggerable single shot 234 similarly can be implemented by a third counter and a decoder where the third counter is reset to zero for each appropriate transition on line 231 and hence is "retriggerable."

While a second embodiment of the present invention employing counters and decoders has been described, other timing circuits which perform the same functions are included within the present invention.

The metering apparatus of FIG. 2 is described in cconnection with a analog-to-digital converter for converting the conventional tone signals in a telephone system to rectangular wave signals. The present invention also encompasses systems in which the control signals employed for signaling are already in digital form. Such signals are available, for example, in modern digital telephone equipment. Where the control signals employed for signaling are rectangular waves and have pulse widths of a predetermined duration, the present invention is employed without the need for the analog-to-digital converter. In such a case, the digital signals are directly input on line 231 of FIG. 2 thereby bypassing the A-to-D portion of the apparatus.

The control 253 in FIG. 1 is a means for timing the duration of a call from a local station 2 to a remote station connected through exchange 6 out over a trunk 20. The call duration timing commences when a detected ringback tone is terminated. For example, control 253 includes a counter which continually counts and is reset to zero each time a ringback tone is detected, that is a 1 appears on line 265. The counter is allowed to count after termination of ringback tones until an onhook condition or other call termination inhibits further counting. At that time the count in the counter is interrogated as a measure of call duration. A detailed implementation of control 253 includes a circulating memory having count fields. Each circulation of the memory increments the count fields thereby measuring call duration. The full details of such a control 253 in this latter embodiment are described in the above-identified cross-referenced application.

While the invention has been particularly shown and described with reference to preferred embodiments thereof it will be understood by those skilled in the art that various changes in form and details may be made therein without departing from the spirit and the scope of the invention.

What is claimed is:

1. a message metering apparatus for operation with a telephone system having local stations and trunk lines, having a switching exchange for connecting the stations to the trunk lines, and having tone signals of predetermined duration for signaling in the telephone system, said apparatus comprising, analog-to-digital converter means for converting said tone signals to rectangular wave signals having pulse widths representing the duration of said tone signals, first detector means including lower limit first means for sensing pulse widths of said rectangular wave signals less than a first lower limit, upper limit first means for sensing pulse widths of said rectangular wave signals greater than a first upper limit, and means, responsive to both said first means for sensing, for indicating when tone signals have a pulse duration between said first lower limit and said first upper limit.

2. The apparatus of claim 1 including timing means responsive to said detector means for sensing for a timed duration the presence of said tone signals having a pulse duration between said first upper and lower limits.

3. The apparatus of Claim 1 including second detector means including lower limit second means for sensing pulse widths of said rectangular wave signals less than a second lower limit, upper limit second means for sensing pulse widths of said rectangular wave signals greater than a second upper limit, and means, responsive to both said second means for sensing, for indicating when tone signals have a pulse duration between said second lower limit and said second upper limit.

4. The apparatus of claim 3 including busy interlock means connected to said first and second detector means for inhibiting the detection by one of said first and second detector means after the other of said first and second detector means detects the presence of a tone signal.

5. The apparatus of claim 3 including third detector means including lower limit third means for sensing pulse widths of said rectangular wave signals less than a third lower limit, upper limit third means for sensing pulse widths of said rectangular wave signals greater than a third upper limit, and means, responsive to both said third means for sensing, for indicating when tone signals have a pulse duration between said third lower limit and said third upper limit.

6. The apparatus of claim 1 wherein one of said means for sensing includes lower limit timing means and the other of said means for sensing includes upper limit timing means, said lower and upper limit timing means responsive to leading edges of said rectangular wave signals for commencing timed operations, said lower limit timing means operative to terminate the timed operations when said first lower limit is reached and said upper limit timing means operative to terminate the timed operation when said first upper limit is reached and where said means for sensing includes flip-flop means for responsively storing an indication that said rectangular wave signal includes a pulse having a pulse width between said lower limit and said upper limit.

7. The apparatus of claim 6 wherein said flip-flop means includes a flip-flop receiving an input from both said lower limit means and said upper limit means whereby said flip-flop is set only when said rectangular wave signal has a pulse width between said upper limit and said lower limit.

8. The apparatus of claim 6 wherein said flip-flop means includes a first flip-flop set whenever said rectangular wave signal has a pulse width greater than said upper limit and includes a second flip-flop set whenever said rectangular wave pulse has a pulse width less than said lower limit and where said apparatus includes gate means connected to said first and second flip-flops for providing an output whenever said first flip-flop or said second flip-flop is set thereby indicating that said rectangular wave signal has a pulse width outside the range between said upper limit and said lower limit.

9. The apparatus of claim 8 including second timing means connected to said gate means operative in response to said gate means for sensing for a timed duration the absence of outputs from said gate means thereby indicating for a timed duration the presence of pulses in said rectangular wave signal having pulse widths between said first upper and lower limits.

10. The apparatus of claim 9 including storage means connected to said second timing means for storing an indication that said pulses have been present for a timed duration.

11. A message metering apparatus for operation with a telephone system having local stations and trunk lines, having a switching exchange for connecting stations to the trunk lines, and having rectangular wave control signals of predetermined pulse width for signaling in the telephone system, said apparatus comprising, first detector means including lower limit first means for sensing pulse widths of said rectangular wave signals less than a first lower limit, upper limit first means for sensing pulse widths of said rectangular wave signals greater than a first upper limit, and means,responsive to both said first means for sensing, for indicating when control signals have a predetermined pulse width between said first lower limit and said first upper limit.

12. A message metering apparatus for operation with a telelphone system having local stations and trunk lines, having a switching exchange for connecting local stations to remote stations over the trunk lines, and having tone signals of predetermined duration for signaling in the telephone system, said tone signals including a ringback tone for signaling the absence of a called-party answer after the calling party has completed dialing, said apparatus comprising, analog-to-digital means for converting said tone signals to rectangular wave signals having pulse widths representing the duration of said tone signals, first detector means for detecting the presence of said ringback tone signals, said first detector means including lower limit first means for sensing pulse widths of said rectangular wave signals less than a first lower limit, upper limit first means for sensing pulse widths of said rectangular wave signals greater than a first upper limit, and means, responsive to both said first means for sensing, to indicate the pulse duration of said ringback tone signals.

13. The apparatus of said claim 12 including timing means, initiated by said first detector means, for timing the duration of calls between the local station and a remote station.

14. A message metering apparatus for operation with a telephone system havng local stations and trunk lines, having a switching exchange for connecting local stations to remote stations over the trunk lines, and having a plurality of tone signals of predetermined duration for signaling in the telephone system, said tone signals including a ringback tone for signaling the absence of a called-party answer after the calling party has completed dialing, a trunk busy tone signal for signaling a trunk busy condition, and a line busy tone signal for signaling the busy condition of a line to a called-party station, said apparatus comprising, analog-to-digital means for converting said tone signals to rectangular wave signals having pulse widths representing the duration of said tone signals, first detector means for detecting the presence of said ringback tone signals, said first detector means including lower limit first means for sensing pulse widths of said rectangular wave signals less than a first lower limit, upper limit first means for sensing pulse widths of said rectangular wave signals greater than a first upper limit, and means, responsive to both said first means for sensing, to indicate the pulse duration of said ringback tone signals, second detector means for detecting the presence of said trunk busy tone signals, said second detector means including lower limit second means for sensing pulse widths of said rectangular wave signals less than a second lower limit, upper limit second means for sensing pulse widths of said rectangular wave signals greater than a second upper limit, and means, responsive to both said second means for sensing, to indicate the pulse duration of said trunk busy tone signals, and third detector means for detecting the presence of said line busy tone signals, said third detector means including lower limit third means for sensing pulse widths of said rectangular wave signals less than a third lower limit, upper limit third means for sensing pulse widths of said rectangular wave signals greater than a third upper limit, and means, responsive to both said third means for sensing, to indicate the pulse duration of said line busy tone signals.

15. The apparatus of claim 14 including busy interlock means connected to said first, second and third detector means for inhibiting the detection by first and second ones of said first, second and third detector means after the third one of said detector means detects the presence of a tone signal.

16. The apparatus of claim 14 including timing means, initiated by said first detector means, for timing the duration of calls between a local station and a remote station.

* * * * *